United States Patent
Sugunadass

(10) Patent No.: US 10,812,403 B2
(45) Date of Patent: Oct. 20, 2020

(54) PROCEDURES, APPARATUSES, SYSTEMS, AND COMPUTER PROGRAM PRODUCTS FOR ADAPTIVE TUNNEL BANDWIDTH BY USING SOFTWARE DEFINED NETWORKING

(71) Applicant: Coriant Operations, Inc., Napeville, IL (US)

(72) Inventor: Rajesh Sugunadass, Naperville, IL (US)

(73) Assignee: Coriant Operations, Inc., Naperville, IL (US)

( * ) Notice: Subject to any disclaimer, the term of this patent is extended or adjusted under 35 U.S.C. 154(b) by 194 days.

(21) Appl. No.: 15/710,129

(22) Filed: Sep. 20, 2017

(65) Prior Publication Data

US 2018/0026901 A1    Jan. 25, 2018

Related U.S. Application Data

(63) Continuation of application No. 14/592,780, filed on Jan. 8, 2015, now Pat. No. 9,787,594.

(51) Int. Cl.
*H04L 12/801*    (2013.01)
*H04L 12/24*    (2006.01)
(Continued)

(52) U.S. Cl.
CPC .......... *H04L 47/29* (2013.01); *H04L 41/0896* (2013.01); *H04L 43/0882* (2013.01);
(Continued)

(58) Field of Classification Search
None
See application file for complete search history.

(56) References Cited

U.S. PATENT DOCUMENTS

| | | |
|---|---|---|
| 5,374,011 A | 12/1994 | Lazarus et al. |
| 6,092,113 A | 7/2000 | Maeshima et al. |
| | (Continued) | |

FOREIGN PATENT DOCUMENTS

| | | |
|---|---|---|
| AU | 2010208544 B2 | 8/2010 |
| CA | 2474879 C | 4/2013 |
| | (Continued) | |

OTHER PUBLICATIONS

"MPLS Traffic Engineering (TE)—Automatic Bandwidth Adjustment for TE Tunnels", http://www.cisco.com/c/en/us/td/docs/ios/12_0s/feature/guide/fsteaut.html#wp1015327, published 2013.
(Continued)

*Primary Examiner* — Kenny S Lin

(57) ABSTRACT

A procedure for managing network traffic, and a system that operates in accordance with the procedure. Performance monitoring data is received from multiple network elements that define one or more paths along a network tunnel. The performance monitoring data includes data on network utilization. There is a detection of whether network utilization through the network tunnel exceeds an overflow threshold or an underflow threshold based on the performance monitoring data. A new path and new network elements are determined for the network tunnel, and instructions are transmitted to the network elements on the network to implement the new path.

24 Claims, 3 Drawing Sheets

(51) Int. Cl.
*H04L 12/715* (2013.01)
*H04L 12/721* (2013.01)
*H04L 12/26* (2006.01)
*H04L 12/917* (2013.01)
*H04L 12/911* (2013.01)
*H04L 12/713* (2013.01)

(52) U.S. Cl.
CPC .............. *H04L 45/64* (2013.01); *H04L 45/70* (2013.01); *H04L 47/12* (2013.01); *H04L 47/76* (2013.01); *H04L 47/781* (2013.01); *H04L 43/0858* (2013.01); *H04L 43/16* (2013.01); *H04L 45/586* (2013.01)

(56) References Cited

U.S. PATENT DOCUMENTS

| | | |
|---|---|---|
| 6,680,922 B1 | 1/2004 | Jorgensen |
| 6,842,463 B1 | 1/2005 | Drwiega et al. |
| 6,901,048 B1 | 5/2005 | Wang et al. |
| 7,093,027 B1 | 8/2006 | Shabtay et al. |
| 7,154,416 B1 | 12/2006 | Savage |
| 7,209,523 B1 | 4/2007 | Larrick et al. |
| 7,251,218 B2 | 7/2007 | Jorgensen |
| 7,266,122 B1 | 9/2007 | Hogg et al. |
| 7,301,911 B2 | 11/2007 | Mack-Crane et al. |
| 7,412,517 B2 | 8/2008 | Jorgensen |
| 7,420,992 B1 | 9/2008 | Fang et al. |
| 7,478,427 B2 | 1/2009 | Mukherjee et al. |
| 7,512,063 B2 | 3/2009 | Vasseur et al. |
| 7,545,735 B1 | 6/2009 | Shabtay et al. |
| 7,649,909 B1 | 1/2010 | Archard et al. |
| 7,660,254 B2 | 2/2010 | Vasseur et al. |
| 7,693,055 B2 | 4/2010 | Vasseur et al. |
| 7,889,675 B2 | 2/2011 | Mack-Crane et al. |
| 7,983,182 B2 | 7/2011 | Mack-Crane et al. |
| 8,400,921 B2 | 3/2013 | Grayson et al. |
| 8,588,793 B2 | 11/2013 | Tomici et al. |
| 8,596,478 B2 | 11/2013 | Haney |
| 8,630,630 B2 | 1/2014 | Raleigh |
| 8,644,164 B2 | 2/2014 | Averi et al. |
| 9,143,557 B2 | 9/2015 | Guichard et al. |
| 9,253,696 B2 | 2/2016 | Rubin et al. |
| 9,621,969 B2 | 4/2017 | Syed et al. |
| 10,091,690 B2 | 10/2018 | Giloh et al. |
| 2002/0012321 A1* | 1/2002 | Rune ............... H04W 56/001 370/252 |
| 2002/0156914 A1 | 10/2002 | Lo |
| 2004/0184483 A1* | 9/2004 | Okamura ............... H04L 47/10 370/477 |
| 2006/0146696 A1 | 7/2006 | Li |
| 2008/0049630 A1 | 2/2008 | Kozisek |
| 2008/0049777 A1 | 2/2008 | Morrill |
| 2008/0095173 A1 | 4/2008 | Bugenhagen |
| 2008/0159159 A1 | 7/2008 | Weinman |
| 2009/0310485 A1 | 12/2009 | Averi et al. |
| 2010/0034115 A1 | 2/2010 | Busch |
| 2010/0039935 A1 | 2/2010 | Davison |
| 2013/0102343 A1 | 4/2013 | Shaw |
| 2015/0127805 A1 | 5/2015 | Htay et al. |
| 2019/0036820 A1 | 1/2019 | Gross, IV et al. |

FOREIGN PATENT DOCUMENTS

| | | |
|---|---|---|
| CN | 104813618 A | 7/2015 |
| EP | 2122942 B1 | 8/2017 |
| EP | 2392121 B1 | 3/2018 |
| KR | 20160048079 A | 5/2016 |
| WO | 2010127365 A1 | 11/2010 |

OTHER PUBLICATIONS

"Configuring Automatic Bandwith Allocation for LSPs", http://www.juniper.net/techpubs/en_US/junos13.3/topics/usage-guidelines/mpls-configuring-automatic-bandwidth-allocation-for-lsps.html, published Dec. 16, 2013.

Office Action dated Aug. 28, 2018 in EP Patent Application 16 711 706.8-1216 (4 pages).

Communication dated May 10, 2019 in application EPO 16 711 708.8, 4 pages.

Written Opinion and International Search Report dated May 10, 2016 in application PCT/US2016/012478.

* cited by examiner

PROCEDURES, APPARATUSES, SYSTEMS, AND COMPUTER PROGRAM PRODUCTS FOR ADAPTIVE TUNNEL BANDWIDTH BY USING SOFTWARE DEFINED NETWORKING

CROSS-REFERENCE TO RELATED APPLICATIONS

This application is a continuation of U.S. patent application Ser. No. 14/592,780 filed on Jan. 8, 2015, the disclosure of which is hereby incorporated by reference in its entirety, as if fully set forth herein.

BACKGROUND

Field

Example aspects described herein relate generally to directing data through a network, and, more specifically, to managing traffic on a network.

Description of the Related Art

In a network including a plurality of devices and intermediate connections, it is often difficult to engineer traffic flow on a communications channel or channels (hereafter referred to as a "tunnel" or "path") between two or more elements on a network. In this regard, packet traffic is unpredictable, and may change unexpectedly. If traffic is too heavy for the tunnel, the network may become congested and drop packets, whereas if traffic is too light for the tunnel, resources of the tunnel are left unused and therefore wasted.

One conventional technique for addressing such changes is to monitor the tunnel utilization and simply change the "size" of the tunnel (i.e. its bandwidth) at the packet layer in response to changes in traffic patterns. For example, if a tunnel is too small for the amount of traffic it is managing, the size of the tunnel can be enlarged in order to handle the additional traffic.

Nevertheless, addressing traffic flow by simply resizing a tunnel has several drawbacks. In particular, acquiring a tunnel of a size to accommodate the required bandwidth may be impossible or infeasible. For example, a large enough tunnel may not exist, or certain portions of the network may have a limited maximum bandwidth. Moreover, managing traffic at the packet layer can be expensive, since additional logic needs to be implemented at routers and other network elements. In addition, simply enlarging one tunnel at one layer ignores efficiencies that might be available by managing the network more globally.

SUMMARY

Existing limitations associated with the foregoing, as well as other limitations, are addressed by a procedure for providing adaptive tunnel bandwidth by using software-defined networking (SDN), and by a system, apparatus, and computer program product that operates in accordance with the procedure.

In one example embodiment herein, a network controller includes an interface operable to receive performance monitoring data from multiple network elements that define one or more paths along a network tunnel. The performance monitoring data includes data on network utilization. The network controller also includes a processor operable to detect whether network utilization through the network tunnel exceeds an overflow threshold or an underflow threshold based on the performance monitoring data, operable to determine a new path and new network elements for the network tunnel, and operable to transmit instructions to the network elements on the network to implement the new path.

According to another example embodiment herein, a procedure for managing network traffic includes receiving performance monitoring data from multiple network elements that define one or more paths along a network tunnel. The performance monitoring data includes data on network utilization. There is a detection of whether network utilization through the network tunnel exceeds an overflow threshold or an underflow threshold based on the performance monitoring data. A new path and new network elements are determined for the network tunnel, and instructions are transmitted to the network elements on the network to implement the new path.

According to yet another example embodiment herein, a non-transitory computer-readable storage medium containing a computer program having instructions which, when executed by a computer, cause the computer to carry out a procedure for managing network traffic. The procedure includes receiving performance monitoring data from multiple network elements that define one or more paths along a network tunnel. The performance monitoring data includes data on network utilization. There is a detection of whether network utilization through the network tunnel exceeds an overflow threshold or an underflow threshold based on the performance monitoring data. A new path and new network elements are determined for the network tunnel, and instructions are transmitted to the network elements on the network to implement the new path.

In still another example embodiment herein, the detection is based on whether a bandwidth between the network elements, as indicated by the performance monitoring data, is more or less than a predetermined threshold bandwidth.

In yet another example embodiment herein, the predetermined threshold bandwidth is received from an interface.

In another example embodiment herein, the detection is based on whether the performance monitoring data indicates that data packets have been lost between the network elements.

In still another example embodiment herein, the detection is based on a delay in transferring data between two or more network elements.

In yet another example embodiment herein, the new path is determined using a look-up table (LUT) which is based on at least one of bandwidth, delay, and a number of network elements used.

In one example embodiment herein, the new path comprises replacement paths which exist on multiple network layers.

In another example embodiment herein, at least one of the replacement paths exists on an optical layer.

In still another example embodiment herein, the performance monitoring data is received periodically at the network controller over a sampling period.

In yet another example embodiment herein, at least one network element of the network tunnel is a router.

BRIEF DESCRIPTION OF THE DRAWINGS

The teachings claimed and/or described herein are further described in terms of exemplary embodiments. These exemplary embodiments are described in detail with reference to the drawings. These embodiments are non-limiting exemplary embodiments, wherein:

DETAILED DESCRIPTION

Figure 1:
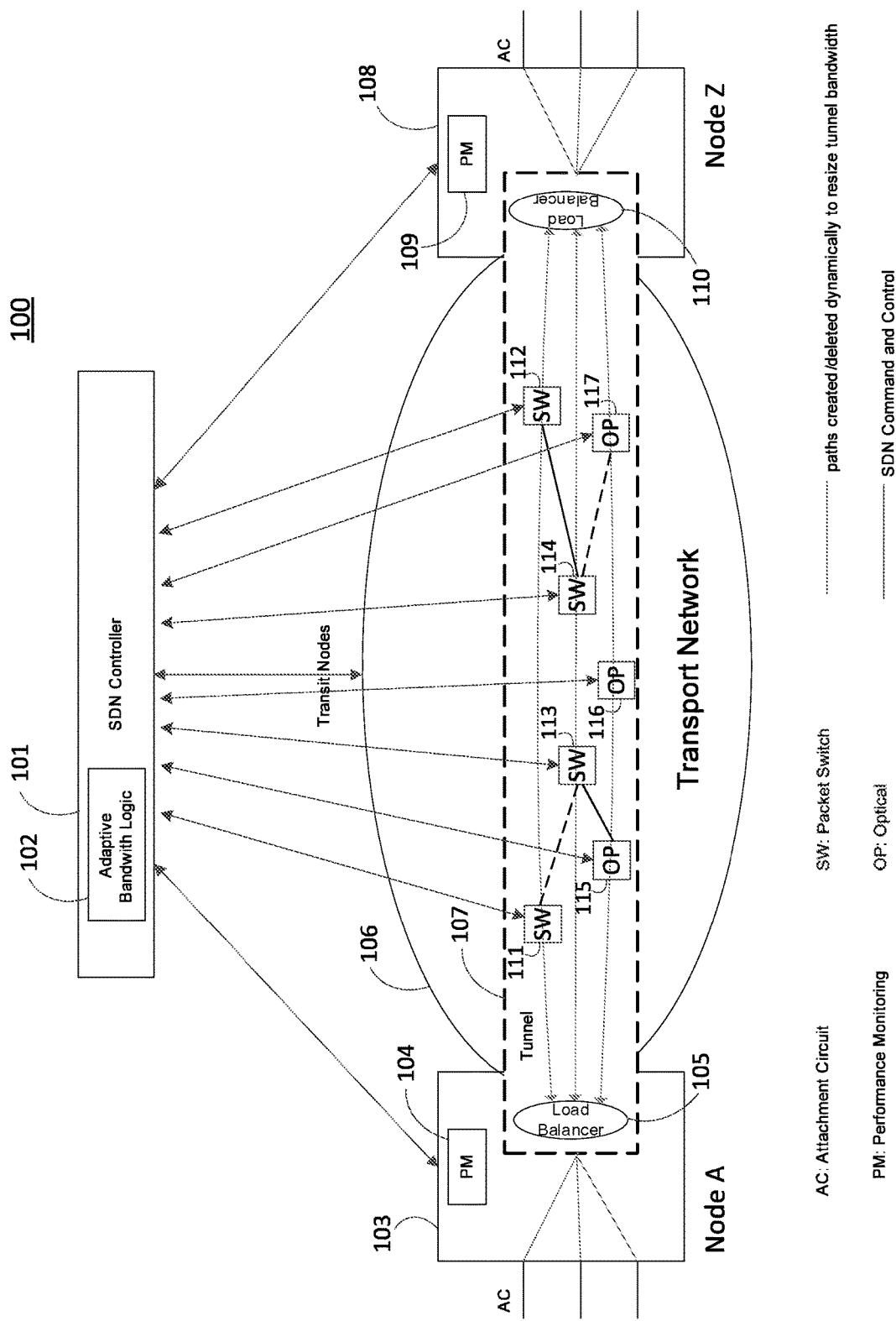
FIG. 1 is a representative view of a communication network according to an example embodiment described herein.

FIG. 1 is a representative view of a communication network 100 in which a plurality of network elements are provided with communication paths to other network elements, according to an example embodiment described herein.

SDN controller 101 is a computing device which implements software defined networking (SDN) in accordance with at least some example aspects of the invention. Thus, SDN controller 101 can also be referred to as a "network controller". SDN controller 101 communicates with other devices on the network to implement changes on the network. In particular, SDN controller 101 determines an optimal path through the network by examining existing flows and the resources necessary to fulfill the request, as described more fully below. In that regard, SDN controller 101 constructs and maintains a global view of what the network looks like, and shifts control of the network from network elements to itself. Accordingly, the underlying hardware infrastructure of the network can be generally hidden from applications. In that regard, while FIG. 1 explicitly depicts connections between SDN controller 101 and various devices, it should be understood that such connections are often virtual or logical (i.e., indirect) connections, rather than direct connections (although such direct connections also can be used).

SDN controller 101 may be embodied as a computer, or, more specifically, a server which includes a processor, a memory, and input and output devices, as described more fully below with respect to FIG. 3. Nevertheless, it should be understood that SDN controller 101 could also be embodied in other computing devices or other arrangements, such as a locally networked bank of servers.

SDN controller 101 includes adaptive bandwidth logic 102, which is hardware and/or software for implementing adaptive tunnel bandwidth using software-defined networking (SDN), as described more fully below. For example, adaptive bandwidth logic 102 may include a look up table (LUT) comprising different options for implementations of network paths based on, for example, a bandwidth, delay, and a number of network elements which can be used for each path.

Network elements 103 and 108 are network devices, such as routers capable of forwarding and receiving data packets across transport network 106 in accordance with a routing mechanism such as a routing table. Each of network elements 103 and 108 may be, for example, a microprocessor-controlled router which may be coupled to two or more data lines configured to direct data traffic through one or more communication networks. In the example shown in FIG. 1, each of network elements 103 and 108 is a network element of tunnel 107 on transport network 106. Thus, in one example, at least one network element of the network tunnel is a router. Nevertheless, network elements may also be other devices, such as switches.

In that regard, network elements 103 and 108 are shown as "Node A" and "Node Z", e.g., "endpoints" on a communication path. Nevertheless, it should be understood that the term "endpoints" as used herein is not so limited. For example, a true physical endpoint of the path may be a user computer connected to one of network elements 103 or 108 on a local network. Alternatively, network elements 103 and 108 may not be final endpoints on transport network 106, but rather intermediate points which are subject to management by SDN controller 101. In addition, paths may be defined between other elements, such as between network element 111 and network element 112, or might be defined as exclusive or inclusive of network elements 103 and 108, and so on.

Network elements 103 and 108 execute self-monitoring so as to generate performance monitoring (PM) data 104 and 109, respectively. PM data 104 and 109 corresponds to information which pertains to network performance, commonly stored by hardware at the node. For example, PM data 104 and 109 may include information on network utilization, such as a number of bytes transferred and received at the node over a period of time (e.g., a bandwidth), whether any packets appear to have been dropped, a delay in transmitting data between two or more network elements, and the like. Network elements 103 and 108 further include load balancers 105 and 110, respectively, which are dedicated hardware and/or software for making sure traffic is flowing through the node properly. For example, a load balancer may verify that data is not arriving out of sequence, split a large data flow into a smaller data flow, and so on.

Transport network 106 is a communication network between multiple elements, such as network elements 103 and 108. The number and nature of devices and connections on the network can vary widely. For example, transport network 106 could be the Internet, a Local Area Network (LAN), Wide Area Network (WAN), Metropolitan Area Network (MAN), or Personal Area Network (PAN), among others. Transport network 106 can be wired or wireless or a combination thereof, and can be implemented, for example, as an Optical fiber, Ethernet, or Wireless LAN network. In addition, the network topology of transport network 106 may vary.

Tunnel 107 is a communications channel or path between network elements 103 and 108 on transport network 106. In that regard, tunnel 107 may be too small or large (i.e., provide too little or too much bandwidth) to fit the needs of data transport between network elements 103 and 108. As such, a path in tunnel 107 originally constructed as a large tunnel (e.g., a path with high bandwidth) may be replaced with multiple replacement paths which may be smaller (e.g., having lower bandwidth), as described more fully below.

In this regard, as can be seen from FIG. 1, tunnel 107 includes network elements 111, 112, 113, 114, 115, 116 and 117. Network elements 111, 112, 113 and 114 are packet switch (SW) elements, whereas network elements 115, 116 and 117 are optical (OP) elements. SDN controller 101 may communicate with each of the elements in order to implement a new path. For example, FIG. 1 depicts network elements 111 and 112 on a first path, network elements 113 and 114 on a second path, and network elements 115, 116 and 117 on a third path. However, based on performance monitoring data, SDN controller 101 might transmit instructions so that network element 111 instead transmits to network element 113, or so that network element 114 communicates with network element 117 (see dotted lines in FIG. 1). Thus, via communication with the network elements, SDN controller 101 can determine a new path and new network elements for the network tunnel, and transmit instructions to the network elements on the network to implement the new path.

Figure 2:
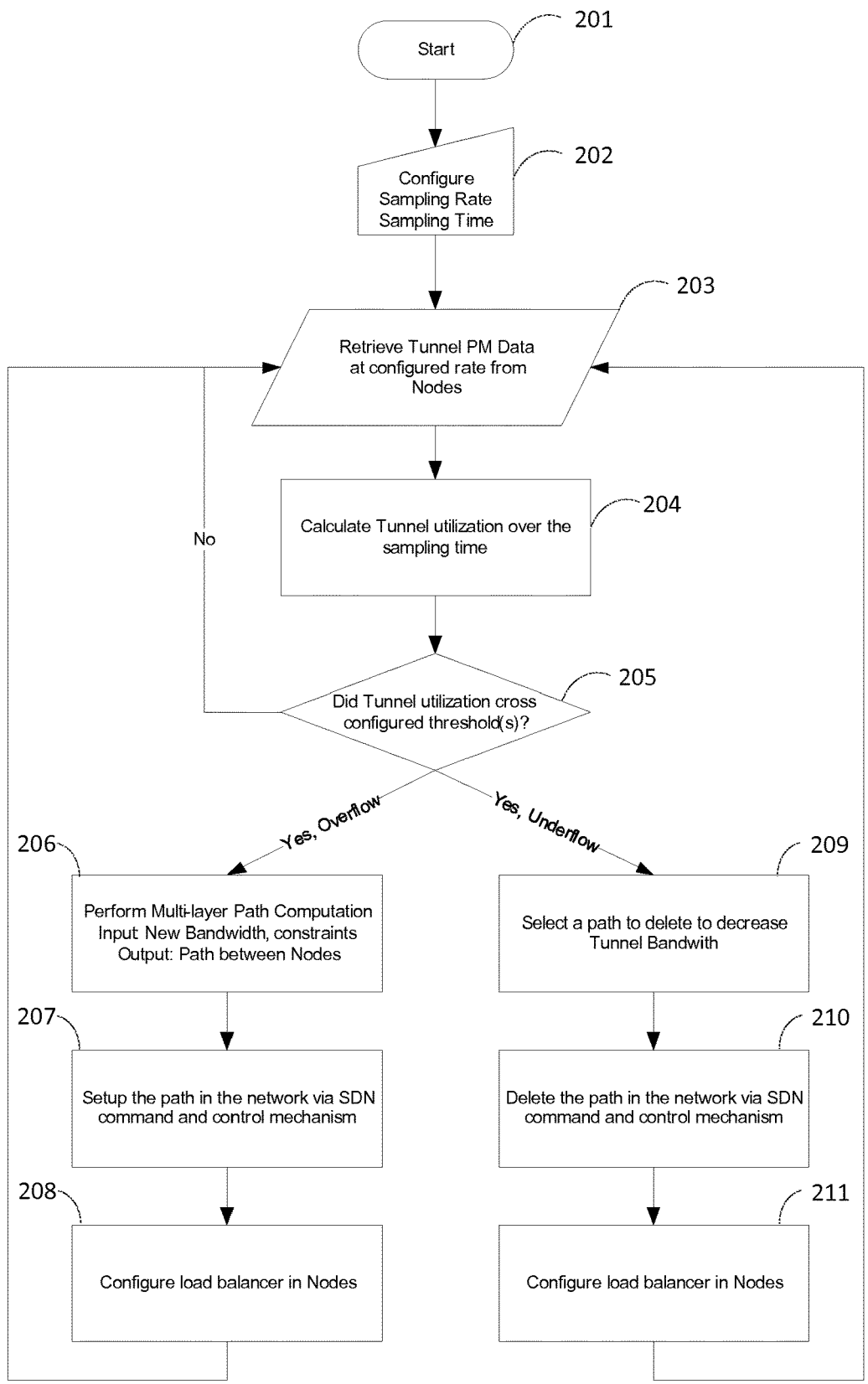
FIG. 2 is a flow diagram illustrating an example procedure for providing adaptive tunnel bandwidth according to an example embodiment described herein.

FIG. 2 is a flow diagram illustrating an example procedure for providing adaptive tunnel bandwidth according to an example embodiment described herein.

Briefly, according to FIG. 2, performance monitoring data is received from multiple network elements that define one or more paths along a network tunnel. The performance monitoring data includes data on network utilization. There is a detection of whether network utilization through the network tunnel exceeds an overflow threshold or an underflow threshold based on the performance monitoring data. A new path and new network elements are determined for the network tunnel, and instructions are transmitted to the network elements on the network to implement the new path.

In block 201, the procedure begins. For example, the procedure may begin upon activation or powering on of SDN controller 101.

In block 202, SDN controller 101 configures the sampling rate and sampling time for monitoring the rate of data flow between network elements, such as network elements 103 and 108. Specifically, SDN controller 101 configures now often bandwidth will be sampled, i.e., how often SDN controller 101 will communicate with the network elements to see how data is moving. The configuration might be initiated by a user. In that regard, FIG. 2 will be described in the context of communication on one or more paths between network elements 103 and 108, but as discussed above, it should be understood that many more devices and elements may exist between network elements 103 and 108, and that network elements 103 and 108 may be intermediate network elements on a particular route of data controlled by SDN controller 101.

In block 203, tunnel performance monitoring (PM) data is retrieved at the configured sampling rate from the network elements (e.g., network elements 103 and 108 and/or network elements 111 to 117). In that regard, typically, network elements keep track of bytes transferred and received, along with other performance data. Thus, for example, a router might store data indicating that it has received 1 gigabyte of data. SDN controller 101 retrieves such data from network elements 103 and 108 by, for example, querying these elements. Accordingly, the performance monitoring data is received periodically at the SDN controller 101 over a sampling period. As mentioned above, PM data may include information on network utilization, such as a number of bytes transferred and received at the node over a period of time (e.g., a bandwidth), whether any packets appear to have been dropped, a delay in transmitting data between two or more network elements, and the like.

In block 204, the tunnel utilization over the sampling time is calculated. For example, from the PM data at network elements 103 and 108, SDN controller 101 determines the real utilization of the tunnel by calculating how much data is flowing through the tunnel in a given time period, e.g., 1.5 gigabytes per minute.

In block 205, there is a determination of whether the tunnel utilization crosses configured threshold(s).

In that regard, SDN controller 101 might acquire or determine one or more bandwidth thresholds (e.g., 1 gigabyte/minute as an overflow threshold, 0.5 gigabyte/minute as an underflow) as baseline speeds for determining overflow/underflow of data traveling in an existing tunnel between New York and Los Angeles. Put another way, the input bandwidth serves as a predetermined threshold bandwidth by which overflow or underflow can be measured. Thus, in one example embodiment, an interface is operable to receive a predetermined threshold bandwidth as an overflow threshold or an underflow threshold based on the performance monitoring data. In that regard, thresholds may also be configured based on different aspects of network utilization, such as a delay in transmitting data between two or more network elements.

Then, in block 205, SDN controller 101 determines whether the bandwidth is over or under the threshold(s). Thus, using the example above, if the data traffic is more than 1 gigabyte/minute (e.g., 1.3 gigabyte/minute), a "larger" path may be needed, whereas if the data traffic is less than 0.5 gigabyte/minute, a "smaller" path may be needed. Accordingly, in this example, there is a detection of whether network utilization through the network tunnel exceeds an overflow threshold or an underflow threshold based on the performance monitoring data. A "larger" path in this context does not mean simply finding a larger tunnel or enlarging an existing one, as conventionally performed, but instead may include determining multiple replacement paths and/or different network elements to transfer the data. In one example, each of the replacement paths may each be smaller than the original path.

In this example, a threshold corresponds to a rate of data transfer (i.e. bandwidth) in the tunnel, but thresholds may also be based on, e.g., whether performance monitoring data indicates that data packets have been lost between the network elements, or a number of packets lost between the network elements. In still another example, the detection of overflow or underflow may be based on a delay between two or more elements on a network. For example, a threshold delay may be set as 10 ms between network elements 103 and 108. If data takes longer than 10 ms, the threshold is crossed, and a new path may be constructed.

If the tunnel utilization has not crossed configured threshold(s), the procedure returns to block 203 to continue monitoring PM data. If the tunnel utilization has crossed an overflow threshold, the procedure proceeds to block 206, whereas if the tunnel utilization has crossed an underflow threshold, the procedure proceeds to block 209.

In block 206, SDN controller 101 performs a multi-layer path computation, with the input being the new bandwidth needed and constraints such as delay, cost, or number of network elements, and outputs a new path between the network elements (network elements 103, 108 and 111 to 117 in FIG. 1). In one example, the new path is determined using a look-up table (LUT) which is based on at least one of bandwidth, delay, and a number of network elements used, and the LUT may be stored in adaptive bandwidth logic 102. Thus, the input to the LUT is constraints (e.g., cost/delay/number of routers), and the output is the new path, often on multiple layers. In that regard, the new path can include multiple replacement paths, and the multiple replacement paths can exist on multiple network layers. For example, one of the replacement paths might be constructed on an optical (physical) layer, whereas another replacement path might be constructed on the packet layer. Since data on the lower layers is treated similarly by all network elements, in determining a new path, SDN controller 101 is not confined to using a particular type of network elements (e.g., routers). In some cases, an optimal path may be one that meets but does not exceed performance criteria. For example, if a 1 gigabyte/s link suffices, it may be wasteful to allocate a 10 gigabyte/s link. Similarly, it may be undesirable to allocate a 5 millisecond (ms) path to fulfill a request for a 10 ms delay if a 10 ms path is available.

In block 208, the new path is set up in the network by SDN controller 101 via the SDN command and control mechanism. In particular, SDN controller 101 contacts the network elements involved in the path and instructs them what to do in order to configure their part of the path. Thus, for example, SDN controller might transmit an instruction to network element 103 to use certain ports for input and output in accordance with the new path. In one example, the new path may be set up using "make-before-break" switching, in which the new path is connected before disconnecting the old one.

In block 208, the load balancers in the network element elements (i.e., load balancers 105 and 110) are configured based on the new path. In this regard, load balancers 105 and 108 may implement a Flow Aware Transport (FAT) or link aggregation (LAG) algorithm to balance and sequence traffic at the node. Once the load balancers are configured, the procedure returns to block 203 to continue monitoring PM data.

Returning to block 205, if the crossed threshold instead indicates an underflow, the procedure proceeds to block 209.

In block 209, a path is selected to delete to decrease tunnel bandwidth. For example, a larger tunnel can be deleted and replaced with one or more replacement tunnels (each of which may be smaller than the original tunnel).

In block 210, the selected path is deleted in the network by SDN controller 101 via the SDN command and control mechanism. For example, as discussed above, SDN controller 101 may transmit instructions to each of the network elements comprising the path.

In block 211, the load balancers in the network element elements (i.e., load balancers 105 and 110) are configured based on the new arrangement of paths. The procedure then returns to block 203 to continue monitoring PM data.

Figure 3:
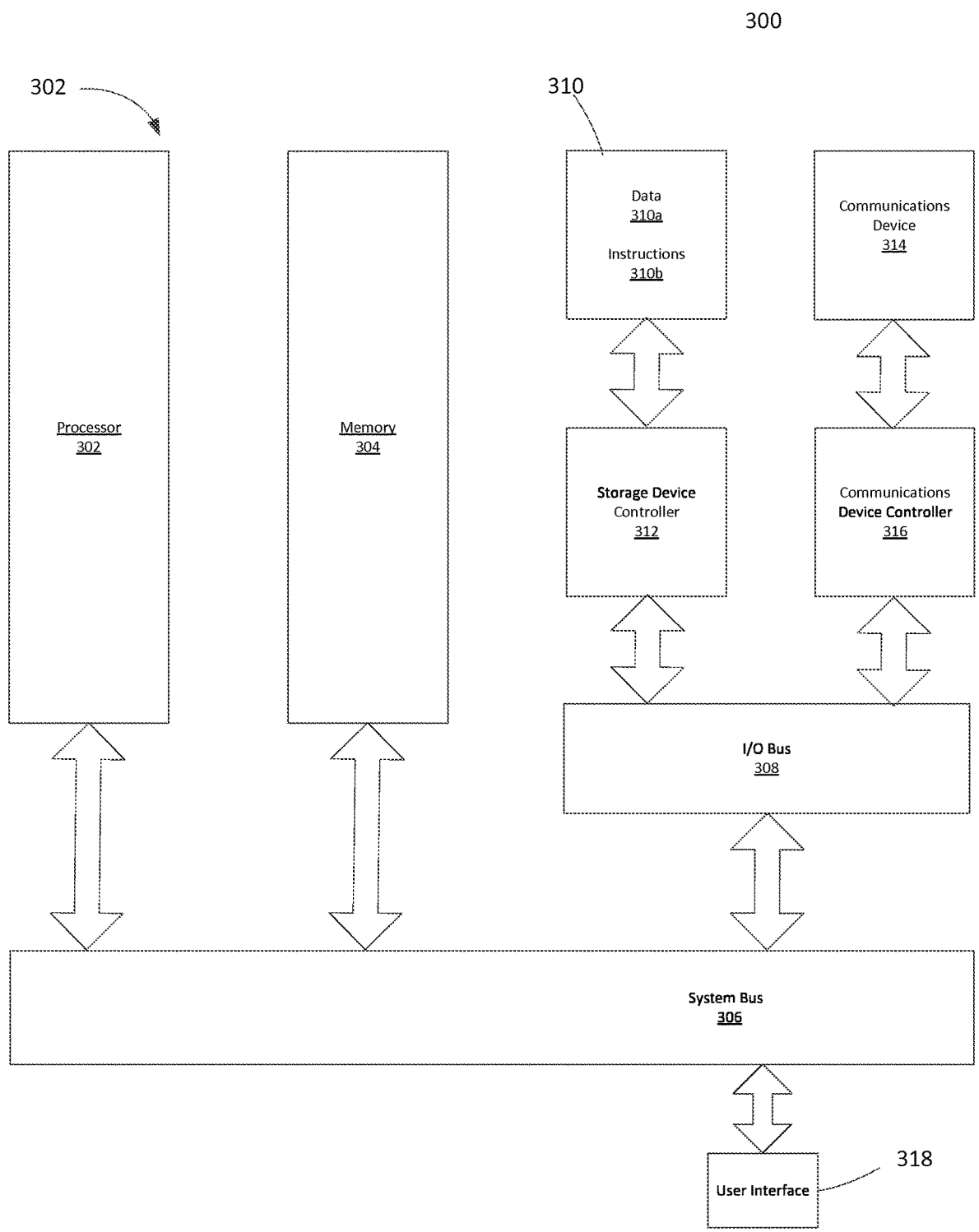
FIG. 3 is an architecture diagram of a processing system in accordance with an example embodiment described herein.

Reference is now made to FIG. 3, which is an architecture diagram of an example network controller 300, which can be used according to various aspects herein. In one example embodiment, network controller 300 may further represent, and/or be included in, individual ones of the SDN controller 101 illustrated in FIG. 1 (e.g., SDN controller 101) or other servers or computers. Network controller 300 can be used to send and/or receive data transferred over a network, such as the communication system 100 described above, according to one example. Network controller 300 includes a processor 302 coupled to a memory 304 via system bus 306. Processor 302 is also coupled to external Input/Output (I/O) devices (not shown) via the system bus 306 and an I/O bus 308, and at least one input/output user interface 318. Processor 302 may be further coupled to a communications device 314 (i.e., an interface) via a communications device controller 316 coupled to the I/O bus 308 and bus 306. Processor 302 uses the communications device 314 to communicate with other elements of a network, such as, for example, network elements such as other ones of the devices of FIG. 1, and the device 314 may have one or more input and output ports. Processor 302 also may include an internal clock (not shown) to keep track of time, periodic time intervals, and the like.

A storage device 310 having a computer-readable medium is coupled to the processor 302 via a storage device controller 312 and the I/O bus 308 and the system bus 306. The storage device 310 is used by the processor 302 and controller 312 to store and read/write data 310a, as well as computer program instructions 310b used to implement the procedure(s) described herein and shown in the accompanying drawing(s) herein (and, in one example, to implement the functions represented in FIG. 3). The storage device 310 also can be used by the processor 302 and the controller 312 to store other types of data, such as Ethernet traffic data. In operation, processor 302 loads the program instructions 310b from the storage device 310 into the memory 304. Processor 302 then executes the loaded program instructions 310b to perform any of the example procedure(s) described herein, for operating the network controller 300.

In the foregoing description, example aspects of the invention are described with reference to specific example embodiments thereof. The specification and drawings are accordingly to be regarded in an illustrative rather than in a restrictive sense. It will, however, be evident that various modifications and changes may be made thereto, in a computer program product or software, hardware, or any combination thereof, without departing from the broader spirit and scope of the present invention.

Software embodiments of example aspects described herein may be provided as a computer program product, or software, that may include an article of manufacture on a machine-accessible, computer-readable, and/or machine-readable medium (memory) having instructions. The instructions on the machine-accessible, computer-readable and/or machine-readable medium may be used to program a computer system or other electronic device. The machine-readable medium may include, but is not limited to, floppy diskettes, optical disks, CD-ROMs, and magneto-optical disks or other types of media/machine-readable medium suitable for storing or transmitting electronic instructions. The techniques described herein are not limited to any particular software configuration. They may find applicability in any computing or processing environment. The terms "machine accessible medium", "computer-readable medium", "machine-readable medium", or "memory" used herein shall include any medium that is capable of storing, encoding, or transmitting a sequence of instructions for execution by the machine and that cause the machine to perform any one of the procedures described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result. In other embodiments, functions performed by software can instead be performed by hardcoded modules.

In addition, it should be understood that the figures illustrated in the attachments, which highlight the functionality and advantages of the present invention, are presented for example purposes only. The architecture of the example aspect of the present invention is sufficiently flexible and configurable, such that it may be utilized (and navigated) in ways other than that shown in the accompanying figures.

Although example aspects herein have been described in certain specific example embodiments, many additional modifications and variations would be apparent to those skilled in the art. It is therefore to be understood that the various example embodiments herein may be practiced otherwise than as specifically described. Thus, the present example embodiments, again, should be considered in all respects as illustrative and not restrictive.

What is claimed is:

1. A method for adapting bandwidth in a transport communication network comprising a plurality of network elements, the method comprising the steps of:

receiving, at a controller, performance monitoring data relating to communications along a network tunnel that extends between a first network element among the plurality of network elements and a second network element among the plurality of network elements, the network tunnel comprising at least a first communication path extending from the first network element to the second network element through at least a third network element among the plurality of network elements;

determining, at the controller based on the received performance monitoring data, at least one of:
 that a network utilization of the network tunnel is at a first threshold, and
 that the network utilization of the network tunnel crossed the first threshold;

selecting, at the controller in response to the determining step, at least one new communication path for the network tunnel, the at least one new communication path comprising at least a second communication path that is a multi-layer communication path extending from the first network element to the second network element through at least a fourth network element among the plurality of network elements, wherein the first communication path does not extend through the fourth network element intermediate the first network element and the second network element; and communicating instructions, from the controller to at least one of the plurality of network elements, to implement the at least one new communication path;

implementing the at least one new communication path in response to instructions communicated from the controller;

wherein a bandwidth of the network tunnel after the implementing step is one of:
 increased relative to a bandwidth of the network tunnel prior to the implementing step, and
 decreased relative to the bandwidth of the network tunnel prior to the implementing step.

2. The method of claim 1, wherein the second communication path also extends through at least the third network element intermediate the first network element and the second network element.

3. The method of claim 1, further comprising a step of configuring, at the controller, a sampling rate and a sampling time for monitoring at least a portion of the network utilization.

4. The method of claim 1, wherein the second communication path does not extend through the third network element intermediate the first network element and the second network element.

5. The method of claim 1, wherein a portion of the second communication path is a same path portion as a portion of the first communication path.

6. The method of claim 5, wherein the same portion comprises a first network layer, and wherein another portion of the second communication path comprises a second network layer that is not the first network layer.

7. The method of claim 1, wherein the network utilization comprises at least one of:
 the bandwidth of the network tunnel prior to the implementing step,
 a number of packets that have been dropped,
 whether any packets have been dropped,
 whether there is any delay in data transmission, and
 an amount of a delay in data transmission.

8. The method of claim 1, wherein at least a portion of the second communication path comprises an optical layer, and wherein the at least one new communication path further comprises a third communication path that is another multi-layer communication path extending from the first network element to the second network element, wherein at least a portion of the third communication path comprises a packet layer.

9. The method of claim 1, wherein the selecting step comprises performing a multi-layer computation based on a new level of bandwidth demand identified for at least a portion of the network tunnel.

10. The method of claim 1, wherein the selecting step comprises:
 inputting constraints to a look-up table; and
 outputting from the look-up table selection of the at least one new communication path.

11. The method of claim 1, wherein at least a portion of the second communication path comprises an optical layer another path in, and wherein the at least one new communication path further comprises a third communication path that is another multi-layer communication path extending from the first network element to the second network element, wherein at least a portion of the third communication path comprises a packet layer.

12. The method of claim 1, wherein the second communication path extends from the first network element to the second network element through at least one optical network element and at least one packet network element, and wherein the second communication path comprises at least a first portion and a second portion, the first portion comprising an optical layer and the second portion comprising a packet layer.

13. The method of claim 1, wherein the instructions comprise make-before-break switching instructions.

14. The method of claim 1, further comprising a step of configuring at least one load balancer based on the at least one new communication path.

15. The method of claim 1, wherein the at least one communication path is selected to supplement the first communication path in the network tunnel, and wherein the bandwidth of the network tunnel after the implementing step is increased relative to a bandwidth of the network tunnel prior to the implementing step.

16. The method of claim 1, wherein the at least one communication path is selected to replace the first communication path in the network tunnel.

17. A transport communication network comprising a plurality of network elements, the transport communication network comprising:
 a network tunnel for communicating traffic between a first network element among the plurality of network elements and a second network element among the plurality of network elements, the network tunnel comprising at least a first communication path extending from the first network element to the second network element through at least a third network element among the plurality of network elements; and
 a network controller, comprising:
  a memory storing a program having instructions for performing a method to adapt a bandwidth of the network tunnel; and
  a computer processor, arranged to execute the instructions to perform the method, the method comprising the steps of:

determining, based on performance monitoring data received at the network controller from at least one of the plurality of network elements, at least one of:
that a network utilization of the network tunnel is at a first threshold, and
that the network utilization of the network tunnel crossed the first threshold;
selecting, in response to the determining step, at least one new communication path for the network tunnel, the at least one new communication path comprising at least a second communication path that is a multi-layer communication path extending from the first network element to the second network element through at least a fourth network element among the plurality of network elements, wherein the first communication path does not extend through the fourth network element intermediate the first network element and the second network element; and
communicating instructions, to at least one of the plurality of network elements, to implement the at least one new communication path;
wherein the instructions are, once implemented, operative to accomplish one of the following:
increase the bandwidth of the network tunnel relative to a bandwidth of the network tunnel prior to the selecting step, and
decrease the bandwidth of the network tunnel relative to the bandwidth of the network tunnel prior to the selecting step.

18. The transport communication network of claim 17, wherein a portion of the second communication path is a same path portion as a portion of the first communication path.

19. The transport communication network of claim 18, the same portion comprises a first network layer, and wherein another portion of the second communication path comprises a second network layer that is not the first network layer.

20. The transport communication network of claim 17, wherein the second communication path extends from the first network element to the second network element through at least one optical network element and at least one packet network element, and wherein the second communication path comprises at least a first portion and a second portion, the first portion comprising an optical layer and the second portion comprising a packet layer.

21. The transport communication network of claim 17, wherein at least a portion of the second communication path comprises an optical layer, and wherein the at least one new communication path further comprises a third communication path that is another multi-layer communication path extending from the first network element to the second network element, wherein at least a portion of the third communication path comprises a packet layer.

22. The transport communication network of claim 17, wherein the selecting step comprises:
performing a multi-layer computation based on a new level of bandwidth demand identified for at least a portion of the network tunnel,
inputting constraints to a look-up table, and
outputting, from the look-up table, a selection of at least the second communication path; and
wherein the network utilization comprises at least one of:
the bandwidth of the network tunnel prior to the implementing step,
a number of packets that have been dropped,
whether any packets have been dropped,
whether there is any delay in data transmission, and
an amount of a delay in data transmission.

23. The transport communication network of claim 17, wherein the at least one communication path is selected to supplement the first communication path in the network tunnel, and wherein the instructions are, once implemented, operative to increase the bandwidth of the network tunnel relative to the bandwidth of the network tunnel prior to the selecting step.

24. The transport communication network of claim 17, wherein the at least one communication path is selected to replace the first communication path in the network tunnel.

* * * * *